(12) United States Patent
Perherin et al.

(10) Patent No.: US 12,370,737 B2
(45) Date of Patent: Jul. 29, 2025

(54) REINFORCED THERMOPLASTIC PIPE

(71) Applicant: AIRBUS ATLANTIC, Rochefort (FR)

(72) Inventors: Daniel Perherin, Saint-Nazaire (FR); Daniel Boulze, Aussonne (FR); Nicolas Hallak, Colomiers (FR)

(73) Assignee: AIRBUS ATLANTIC, Rochefort (FR)

( * ) Notice: Subject to any disclaimer, the term of this patent is extended or adjusted under 35 U.S.C. 154(b) by 340 days.

(21) Appl. No.: 18/253,369

(22) PCT Filed: Nov. 8, 2021

(86) PCT No.: PCT/EP2021/080892
§ 371 (c)(1),
(2) Date: May 17, 2023

(87) PCT Pub. No.: WO2022/106231
PCT Pub. Date: May 27, 2022

(65) Prior Publication Data
US 2024/0025105 A1 Jan. 25, 2024

(30) Foreign Application Priority Data
Nov. 19, 2020 (FR) ...................................... 2011878

(51) Int. Cl.
B23D 23/00 (2006.01)
B29C 53/08 (2006.01)
B29C 70/20 (2006.01)
B29D 23/00 (2006.01)
F16L 9/133 (2006.01)
(Continued)

(52) U.S. Cl.
CPC ............ *B29C 53/083* (2013.01); *B29C 70/20* (2013.01); *B29D 23/006* (2013.01); *F16L 9/133* (2013.01); *F16L 43/008* (2013.01); *B29K 2071/00* (2013.01); *B29K 2105/0881* (2013.01); *B29L 2023/22* (2013.01); *B29L 2031/243* (2013.01); *B29L 2031/3076* (2013.01)

(58) Field of Classification Search
None
See application file for complete search history.

(56) References Cited

U.S. PATENT DOCUMENTS

| 2014/0238525 A1 | 8/2014 | Dyksterhouse |
| 2019/0113158 A1 | 4/2019 | Zhou et al. |
| 2020/0200428 A1 | 6/2020 | Mills et al. |

FOREIGN PATENT DOCUMENTS

| DE | 102009023289 A1 | 1/2011 |
| EP | 2041466 A1 | 4/2009 |

(Continued)

OTHER PUBLICATIONS

Search Report from the French Intellectual Property Office on corresponding FR application (FR2011878) dated Jun. 9, 2021.

(Continued)

Primary Examiner — Armand Melendez
(74) Attorney, Agent, or Firm — Alumen IP Law PC

(57) ABSTRACT

A pipe intended to be mounted in a fluid circuit of an aircraft, the pipe comprising a tube and two connection ends, the tube being made of a thermoplastic material and having a cylindrical shape, the tube defining an internal surface, intended to be in contact with the fluid, and an external surface opposite the internal surface, the pipe comprising at least one reinforcement band extending longitudinally on the external surface of a longitudinal portion of the tube, so as to form a reinforced portion of the tube.

9 Claims, 6 Drawing Sheets

(51) Int. Cl.
*F16L 43/00* (2006.01)
*B29K 71/00* (2006.01)
*B29K 105/08* (2006.01)
*B29L 23/00* (2006.01)
*B29L 31/24* (2006.01)
*B29L 31/30* (2006.01)

(56) References Cited

FOREIGN PATENT DOCUMENTS

| EP | 3285985 A1 | 2/2018 |
| EP | 3548196 A1 | 10/2019 |
| FR | 3081532 A1 | 11/2019 |
| WO | 2019224271 A1 | 11/2019 |

OTHER PUBLICATIONS

International Search Report and Written Opinion on corresponding PCT application (PCT/EP2021/080892) from International Searching Authority (EPO) dated Feb. 10, 2022.

REINFORCED THERMOPLASTIC PIPE

TECHNICAL FIELD

The present invention relates to the field of pipes intended to be mounted in a fluid circuit of an aircraft, for example a drinking water, waste water, etc. circuit.

In a known manner, a fluid circuit comprises a plurality of pipes mechanically and fluidically connected to each other. When setting up a fluid circuit in an aircraft, the pipes are independently attached to the aircraft structure and then fluidly connected to each other.

In practice, when setting up the fluid circuit in an aircraft, an assembly clearance is kept to take into account the relative deformations or displacements between the pipes and the supporting structure.

When the fluid is circulated in the fluid circuit, each pipe is pressurized, causing radial and longitudinal forces to appear. In practice, when the entire fluid circuit is pressurized, the axial clearance is consumed and a buckling phenomenon may appear in one or more pipes, which may damage the pipes.

In addition, in order to lighten the mass of an aircraft, pipes are increasingly made from tubes made of thermoplastic material, and more particularly from tubes made entirely of polymeric material of the polyaryletherketone family, known under the acronym PAEK, such as PEEK (polyetheretherketone) or PEKK (polyetherketoneketone), which enables the manufacture of semi-rigid, light and strong pipes. Such a thermoplastic pipe also has a low thickness. A thin thermoplastic pipe may be impacted by the buckling phenomenon described above.

An immediate solution to eliminate this advantage would be to reinforce the thermoplastic tube during manufacture, for example by incorporating reinforcing fibers into the thermoplastic material, such as carbon fibers. However, such a tube known as a "carbon tube" is more expensive and has the disadvantage of being very difficult to bend. Indeed, when assembling a fluid circuit, the pipes each have a predetermined profile to follow, for example, the curvatures of the aircraft structure or to bypass equipment. To do this, each pipe may be curved locally, this is referred to as bending. A carbon tube cannot be conveniently bent and therefore cannot be mounted in an aircraft fluid circuit in a simple way.

Another obvious solution would be to use pipes made from tubes made of a stronger material, for example metal, but this goes against the mass reduction of a fluid circuit for an aircraft.

In summary, there is currently no solution for mounting in a fluid circuit, a pipe capable of resisting buckling while being light and respecting the technical specifications of an aircraft.

The invention thus aims to eliminate at least some of these disadvantages by proposing a reinforced thermoplastic, light, robust pipe and comprising all the characteristics capable of meeting the technical requirements of an aircraft. Furthermore, the pipe according to the invention may be easily bent while maintaining its mechanical properties and its buckling resistance.

SUMMARY

The invention relates to a pipe intended to be mounted in a fluid circuit of an aircraft, the pipe comprising a tube and two connection ends, the tube being made of a thermoplastic material and having a cylindrical shape, the tube defining an internal surface, intended to be in contact with the fluid, and an external surface opposite the internal surface.

The pipe is remarkable in that it comprises at least one reinforcement band extending longitudinally on the external surface of a longitudinal portion of the tube, so as to form a reinforced portion of the tube.

The pipe according to the invention is thus locally reinforced and may withstand the buckling forces due to the pressurization of the fluid circuit. Thanks to the reinforcement band according to the invention, the pipe may be manufactured from the tubes of the prior art, which limits the impact of the costs of reinforcing the pipe. In addition, the addition of a reinforcement band makes it possible to resist buckling while maintaining thin tubes that are lighter, less expensive and easy to handle. The pipe comprising a tube made of thermoplastic material and reinforced is thus both light and robust.

Adding a reinforcement band to an existing thermoplastic tube is also quick and easy to achieve and has little impact on the production cost.

Preferably, the reinforcement band comprises reinforcement fibers impregnated with a thermoplastic resin. The reinforcement band is thus light while having substantial resistance.

Preferably, the thermoplastic resin of the reinforcement band is identical to the thermoplastic material of the tube, allowing a robust connection between the tube and the reinforcement band while ensuring a similar behavior at the junction between the tube and the reinforcement band. Such an identical material limits the risk of modifying the tube material at the interface between the tube and the reinforcement band, which avoids impacting the mechanical properties of the pipe.

Preferably, the thermoplastic resin of the reinforcement band and the tube is a polymer of the polyaryletherketone family, known under the acronym PAEK, such as PEEK (polyetheretherketone) or PEKK (polyetherketoneketone), allowing the use of a material of known behavior.

Preferably, the reinforcement fibers are unidirectional fibers, making it possible to reinforce the tube while ensuring simple and quick manufacture of the reinforcement band.

Preferably, the reinforcement fibers are glass fibers, carbon fibers, aramid or any other natural fibers, which ensures substantial stiffness of the reinforcement band and ensures the resistance of the pipe to buckling.

In a preferred embodiment, in a cross-sectional plane, the reinforcement band(s) extend(s) over an angular range of from 28 to 58° at the periphery of the reinforced portion. Such an angular range allows covering a substantial portion of the external surface, allowing optimum reinforcement, without requiring to fully cover the portion to be reinforced of the tube, which limits its increase in weight and impact on its manufacturing.

Preferably, the angular range depends on the radius of the tube and represents a percentage between 31 and 64% of the outer perimeter of the tube.

Preferably, the reinforced portion comprises a plurality of reinforcement bands, distributed angularly on the external surface of the reinforced portion and positioned equidistant from each other.

In one embodiment, the reinforced portion comprises at least three reinforcement bands distributed angularly on the external surface of the reinforced portion and positioned equidistantly from each other. Such a distribution allows equivalent reinforcement of the entire periphery of the tube, ensuring uniform radial resistance to buckling.

In an alternative embodiment, the reinforced portion comprises four reinforcement bands distributed angularly on the external surface of the reinforced portion and positioned equidistantly from each other. The positioning of four reinforcing bands enables optimum distribution of the reinforcing bands at the periphery of the tube, allowing even radial pressure resistance. In addition, the application of four reinforcement bands allows the use of reinforcement bands with a width of ¼ inch (6.35 mm) known while guaranteeing optimum coverage of 31%, 43% or 64% of the external surface of the tube, corresponding respectively to a tube with a diameter of 1 inch (25.4 mm), ¾ inch (19.05 mm) or ½ inch (12.7 mm).

In one embodiment, the reinforcement band has a width of between ⅛ inch (3.2 mm) and ½ inch (12.7 mm). Preferably still, the reinforcement band has a width of ¼ inch (6.35 mm), allowing the use of known reinforcement bands. Therefore, the reinforcement band does not require any particular manufacturing method or the use of specific machines. The use of such a reinforcement band saves time in the manufacture of the reinforced pipe.

Preferably, the reinforcement band has a thickness of between 0.1 and 0.4 mm. Thus, the reinforcement band(s) increase(s) the tube thickness very little, allowing the reinforced tube to be mounted in production machines and in particular in existing bending machines. The reinforced tube portions do not impact the industrial process of manufacturing a pipe.

The invention also relates to a fluid circuit comprising at least one first pipe and a second pipe as described previously, a first connection end of the first pipe being mounted opposite one of the connection ends of the second pipe.

The invention also relates to a method for manufacturing a pipe as described previously, the method comprising:
  a step of determining at least one portion to be reinforced of the tube, and
  a step of positioning at least one reinforcement band over the external surface of the portion to be reinforced of the tube.

Such a manufacturing method allows local reinforcement only on a targeted portion, ensuring continuity of the existing production line.

In a preferred embodiment, the reinforcement band comprising a lower surface, intended to be in contact with the external surface of the tube, and an upper surface opposite the lower surface, the method comprises, after the step of positioning at least one reinforcement band, a step of positioning at least one pressure member in contact with the upper surface of the reinforcement band, the pressure member being configured to apply a radial pressure.

Preferably, the step of positioning being carried out by at least three pressure members distributed angularly at the periphery of the tube on the external surface, the three pressure members being positioned equidistant from each other, at least one pressure member being positioned in contact with the upper surface of the reinforcement band, the method comprises a step of simultaneously applying a radial and identical pressure force by the three pressure members on the external surface of the tube, in order to deposit the reinforcement band while ensuring uniform pressure over the entire periphery of the portion to be reinforced of the tube.

Simultaneous application of a same pressure force by three pressure members distributed angularly on the external surface of the tube avoids any deformation of the tube during application of the reinforcement bands. The method therefore does not affect the resistance of the pipe.

In one embodiment, each pressure member has the form of a roller capable of moving longitudinally along the tube.

Alternatively, each pressure member is fixed, the tube being configured to move longitudinally.

Preferably, the method comprises after the step of positioning at least one reinforcement band, a step of heating the external surface of the portion to be reinforced of the tube and/or the reinforcement band, so as to allow welding of the reinforcement band onto the portion to be reinforced to form the reinforced portion.

Preferably, the method comprises after the step of positioning at least one reinforcement band, a step of welding the reinforcement band to the external surface of the portion to be reinforced of the tube, so as to form the reinforced portion. The application of the reinforcement bands is thus simple and quick to produce, which has very little impact on the manufacturing lead times of the pipes.

Preferably, the manufacturing method comprises:
  a step of determining at least two portions to be reinforced,
  a step of determining at least one portion to be bent, the portion to be bent being positioned between the two portions to be reinforced,
  a step of positioning at least one reinforcement band on the external surface of the two portions to be reinforced, the portion to be bent being free of reinforcement band, then
  a step of bending the portion to be bent.

By differentiating between the portions to be reinforced and the portions to be bent at the beginning of the method, only the portions to be reinforced are intended to be reinforced. Portions that do not need to be reinforced, such as portions to be bent for example, are free of the reinforcement band application and may follow the usual production chain. Such a characteristic ensures the bending of the portions to be bent after the depositing of the reinforcement bands on the portions to be reinforced, enabling the production line usually known from prior art to be guaranteed after depositing of the reinforcement bands.

BRIEF DESCRIPTION OF THE DRAWINGS

The invention will be better understood upon reading the following description, given as an example, and by referring to the following figures, given as non-limiting examples, wherein identical references are given to similar objects.

It should be noted that the figures set out the invention in detail in order to implement the invention, said figures may of course be used to better define the invention if necessary.

DETAILED DESCRIPTION

The invention relates to a pipe intended to be mounted in a fluid circuit of an aircraft, for example a drinking water circuit. As described previously, a fluid circuit comprises a plurality of pipes mechanically and fluidically connected to each other and wherein a fluid circulates.

As previously described, each pipe 1 has a predetermined profile to follow for example the curvatures of the aircraft structure or bypass equipment. To do this, each pipe 1 may be bent locally. Also, in this application, distinguished are an initial state of the pipe 1 before bending, i.e. the pipe 1 extends longitudinally over its entire length, and a final state after bending, i.e. a state wherein the pipe 1 has one or more curved portions.

Figure 1:
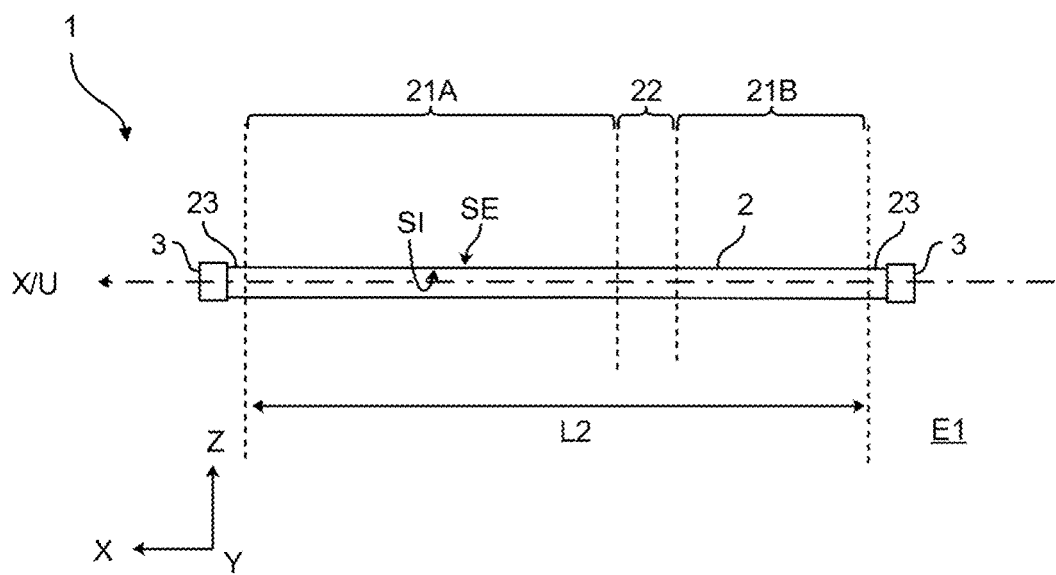
FIG. 1 is a schematic representation of a pipe intended to be mounted in a fluid system.

In the initial state, shown in FIG. 1, the pipe 1 extends longitudinally along an X axis, transversely along an axis Y and vertically along an axis Z, so as to form a system of coordinates (X, Y, Z).

Each pipe 1 comprises a tube 2 and two connection ends 3. It goes without saying that the tube 2 comprising two connection ends 3 may be part of an assembly comprising one or more connection fittings, as is known. The connection ends are in themselves known to those skilled in the art, so they will not be further described in this document.

Figure 3:
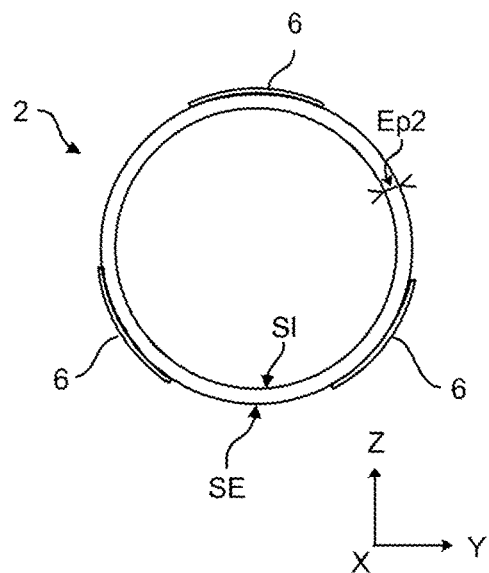
FIG. 3 is a schematic representation of a cross-sectional view of the reinforced pipe of FIG. 2.
Figure 4:
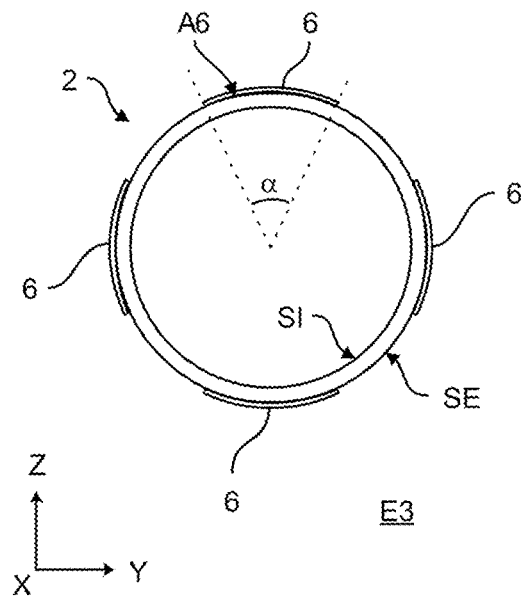
FIG. 4 is a cross-sectional view of a reinforced pipe according to a second embodiment of the invention.

The tube 2 has a cylindrical shape and defines an internal surface SI, intended to be in contact with the fluid, and an external surface SE opposite the internal surface SI (FIGS. 3 and 4). Preferably, the section is circular.

According to the invention, the tube 2 is made of a thermoplastic material, i.e. it is entirely made of thermoplastic material, allowing the use of a light material. In other words, the tube 2 does not comprise any reinforcing fibers in the thickness of its wall. Preferably, the tube 2 is made of polyaryletherketones (PAEK). It goes without saying that tube 2 may be made of a different thermoplastic resin, for example polyetherimide (PEI).

Still in reference to FIG. 1, the tube 2 preferably has a length L2 of between 500 and 3000 mm in the initial state. The tube 2 also has a thickness Ep2 (shown in FIG. 3) preferably between 0.8 and 1.3 mm. The pipe 1 is therefore light and easy to handle when installed in a fluid circuit.

As shown in FIG. 1, the tube 2 according to the invention comprises one or more portions known as "portion to be reinforced" 21. In this example, the tube 2 comprises two portions to be reinforced 21A, 21B, extending longitudinally along a U-portion axis. When the pipe 1 is in the initial state, the U-portion axis is confounded with the longitudinal axis X.

In this example, the tube 2 also comprises a portion known as a "portion to be bent" 22. Preferably, the portion to be bent 22 is positioned between the two portions to be reinforced 21A, 21B, as shown in FIG. 1. Such a portion to be bent 22 corresponds to a portion of the tube 2 which is not to be reinforced and more precisely which must not be reinforced, as will be described in more detail later.

Preferably, the tube 2 comprises a plurality of portions not to be reinforced. In particular, the portions not to be reinforced correspond to the portions to be bent 22 and the end portions 23, intended to be connected to a connection end 3.

This document presents the example of a tube 2 of pipe 1 comprising two portions to be reinforced 21A, 21B and a portion to be bent 22. However, it goes without saying that the tube 2 may comprise a different number of portions to be reinforced 21 and portions to be bent 22.

Figure 2:
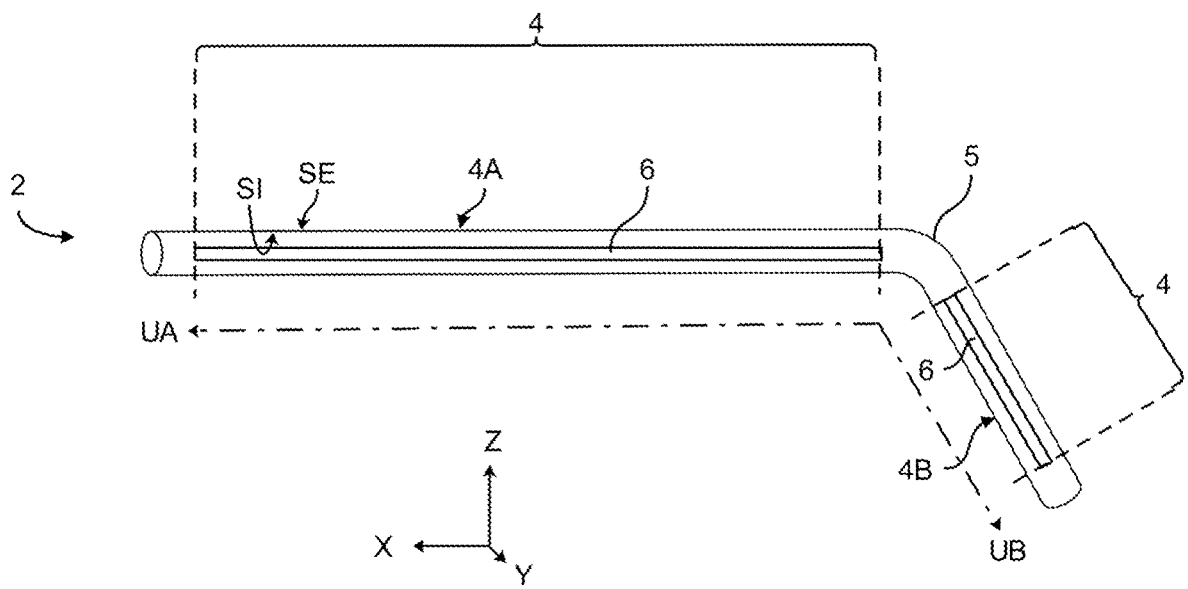
FIG. 2 is a schematic representation of a reinforced pipe according to a first embodiment of the invention.

FIG. 2 shows a tube 2 in its final state. In this state, the tube 2 comprises two reinforced portions 4A, 4B (corresponding to the two portions to be reinforced 21A, 21B of the initial state), each extending along an axis of portion UA, UB, and a bent portion 5 (corresponding to the portion to be bent 22 of the initial state), positioned between the two reinforced portions 4A, 4B. In other words, the portions to be reinforced 21A, 21B make it possible to form in the final state the reinforced portions 4A, 4B and the portion to be bent 22 makes it possible to form in the final state the bent portion 5.

In reference to FIG. 2, the pipe 1 according to the invention comprises one or more reinforcement bands 6 extending longitudinally on the external surface SE of each portion to be reinforced 21A, 21B of the tube 2, so as to ultimately form a reinforced portion 4, as will be presented in more detail later. Subsequently, the term "portion to be reinforced" 21A, 21B refers to the portions of tube 2 intended to receive one or more reinforcement bands 6, and the term "reinforced portion" 4 refers to the portions of tube 2 to which reinforcement bands 6 are applied.

Preferably, the pipe 1 comprises at least one reinforcement band 6 on each reinforced portion 4 of tube 2. Preferably, the reinforced portions 4 of a same tube 2 are associated with the same number of reinforcement bands 6.

In a first embodiment, in reference to FIG. 3, representing a cross-sectional view of the pipe 1, the latter comprises three reinforcement bands 6 on each reinforced portion 4, the three reinforcement bands 6 being distributed angularly on the external surface SE of the tube 2 and being positioned equidistant from each other. In a second preferred embodiment, shown in FIG. 4, the pipe 1 comprises four reinforcement bands 6 on each reinforced portion 4, the four reinforcement bands 6 being distributed angularly on the external surface SE of the tube 2 and being positioned equidistant from each other.

It goes without saying that the number of reinforcement bands 6 could be different, it is preferably even. In addition, the reinforcement bands 6 are preferably arranged symmetrically in order to limit buckling in two opposite directions.

In a preferred embodiment, each reinforcement band 6 extends, in a cross-sectional plane (Y, Z), over an angular range a ranging from 28 to 58°, shown in FIG. 4. Such an angular range a depends on the radius of the tube 2. In other words, each reinforcement band 6 preferably extends over an angular perimeter A6 of between 31% and 64% of the external perimeter of the tube 2.

Figure 5:
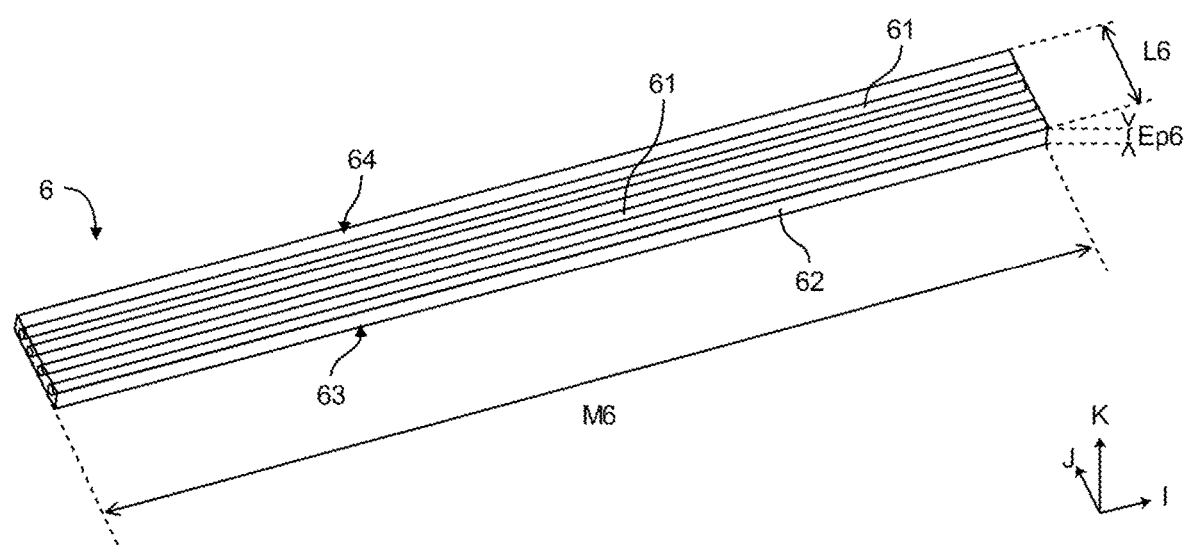
FIG. 5 is a schematic representation of a reinforcement band intended to be mounted on the reinforced pipe according to the invention.
Figure 6:
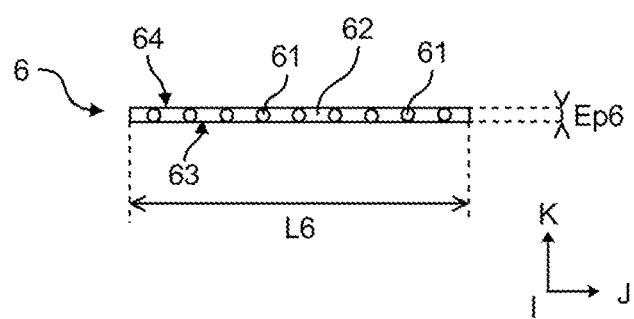
FIG. 6 is a cross-sectional view of the reinforcement band in FIG. 5.

In reference to FIGS. 5 and 6, each reinforcement band 6 extends longitudinally along an axis I, transversely along an axis J and vertically along an axis K, so as to form a system of coordinates (I, J, K). When the reinforcement band 6 is positioned on the external surface SE of the tube 2, the longitudinal axis I of the reinforcement band 6 is confounded with the longitudinal axis X of the pipe 1.

Each reinforcement band 6 has a lower surface 63, intended to be in contact with the external surface SE of the tube 2, and an upper surface 64 opposite the lower surface 63.

In a preferred embodiment, each reinforcement band 6 comprises reinforcement fibers 61 impregnated with a thermoplastic resin 62. Preferably, the thermoplastic resin 62 of the reinforcement band 6 is identical to the thermoplastic material of the tube 2, so as to allow effective and homogeneous attachment between each portion to be reinforced 21A, 21B of the tube 2 and the reinforcement band 6. The thermoplastic resin 62 of the reinforcement band 6 is preferably polyaryletherketone (PAEK). It goes without saying that the reinforcement band 6 may be made of a different thermoplastic resin, e.g. polyetherimide (PEI) compatible with polyaryletherketone (PAEK).

Each reinforcement band 6 is configured to be attached to the external surface SE of the tube 2 preferably by welding bonding. Such a bonding method is known per se for joining thermoplastic parts. It goes without saying that the reinforcement bands 6 may be mechanically connected to the external surface SE of the tube 2 by any other means, for example, by applying adhesive.

Preferably, the reinforcement fibers 61 are unidirectional fibers extending longitudinally along the axis I, as shown in FIG. 5. Such unidirectional fibers are advantageous for reducing buckling according to the direction of said fibers. In addition, the reinforcing fibers 61 are preferably glass fibers, carbon or aramid fibers. Alternatively, each reinforcement band 6 may comprise a stack of several layers of unidirectional reinforcement fibers 61 to enable even greater reinforcement of the tube 2.

In this example, still in reference to FIGS. 5 and 6, each reinforcement band 6 has a width L6 along the axis J of between ⅛ of an inch, i.e. 3.2 mm and ½ of an inch, i.e. 12.7 mm. Preferably, such a width L6 is substantially equal to ¼ inch (6.35 mm), so as to cover 31%, 43% or 64% of the external surface SE of the tube 2, respectively for a tube with a diameter of 1 inch (25.4 mm), ¾ inch (19.05 mm) or ½ inch (12.7 mm). Each reinforcement band 6 also has a length M6 along the axis I previously defined according to the length of the portion to be reinforced 21A, 21B to which the reinforcement band 6 is intended to be applied. The length M6 is thus preferably between 450 and 700 mm, so as to apply a reinforcement band 6 over the entire length of each portion to be reinforced 21A, 21B. Preferably, the reinforcement band 6 is packaged in rolls and cut to the desired length.

Preferably, each reinforcement band 6 has a thickness Ep6 of between 0.1 and 0.4 mm. Such a thickness Ep6 of the reinforcement band 6 limits the increase in the total thickness of the tube 2, which prevents any impact on the production chain of the pipes 1, by allowing the use of machines known and already used in this field. In other words, even with one or more reinforcement bands 6 deposited on the external surface SE of tube 2, the latter may be mounted in machines of the existing production line and in particular in existing bending machines. In summary, each reinforced portion 4 has a thickness close to the thickness of the non-reinforced portions, which makes it possible not to impact the industrial manufacturing process of the pipe 1.

Figure 7:
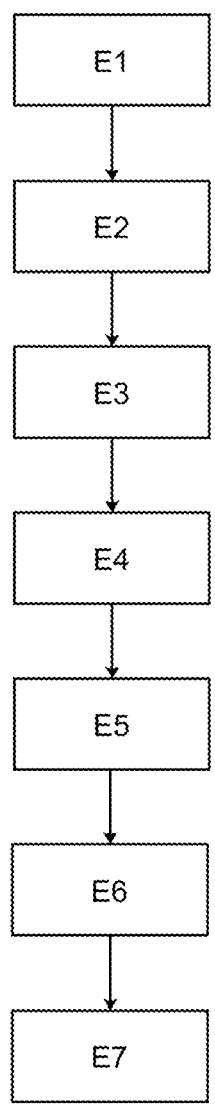
FIG. 7 is a schematic representation of the steps of a method for manufacturing a reinforced pipe according to an embodiment of the invention.

A method for manufacturing a pipe 1 according to an embodiment of the invention, in reference to FIGS. 7 to 9, will now be described. At the beginning of the manufacturing method, the pipe 1 is initially in its initial state, shown in FIG. 1 and wherein the tube 2 extends fully along the longitudinal axis X.

The method first comprises a step of determining E1 of one or more portions to be reinforced 21 of the tube 2. Preferably, the operator also determines, in a second step of determining E2, one or more portions to be bent 22 of the tube 2. In this example, the operator determines two portions to be reinforced 21A, 21B and a portion to be bent 22, the portion to be bent 22 being positioned between the two portions to be reinforced 21A, 21B, as shown in FIG. 1.

In this example, the operator then positions, in a step of positioning E3, four reinforcement bands 6 on the external surface SE of the first portion to be reinforced 21A of the tube 2. The reinforcement bands 6 are positioned so as to be distributed angularly over the external surface SE of the tube 2, being positioned equidistant from each other, as shown in FIG. 4. It goes without saying that the number of reinforcement bands 6 positioned on the external surface SE of the tube 2 could be different. The operation is then repeated for the positioning in this example of four reinforcement bands 6 on the external surface SE of the second portion to be reinforced 21B. In this step, no reinforcement band 6 is positioned on the external surface SE of the portion to be bent 22, which is then only made of thermoplastic material.

In a preferred embodiment, the operator then places, in a step of positioning E4, four pressure members R on the external surface SE of the tube 2. The four pressure members R are preferably distributed angularly at the periphery of the tube 2, equidistant from each other. More preferably, as shown in FIGS. 8 and 9, the four pressure members R are positioned at the periphery of the tube 2 so as to be centered on each reinforcement band 6, allowing effective and optimal application of the reinforcement bands 6. This document presents the example of four pressure members R, however, it goes without saying that the number of pressure members R may be different, as long as the pressure members R are evenly distributed at the periphery of the tube 2, so as to ensure uniform pressure over the periphery of the tube 2 and thus avoid any deformation of the tube 2, as described in more detail below.

In this example, each pressure member R has the form of a roller which rotates about an axis V (shown in FIG. 9) and which moves along the longitudinal axis X of the tube 2, to enable the reinforcement bands 6 to be applied along their entire length M6. It goes without saying that each pressure member R in the form of a roller could also be fixed.

The method then preferably comprises a simultaneous step of heating E5 by a heating device S (shown in FIG. 8) of the external surface SE of the first portion to be reinforced 21A of the tube 2 and the lower surface 63 of each reinforcement band 6, so as to allow bonding welding of the reinforcement band 6 on the first portion to be reinforced 21A to form the first reinforced portion 4A. It goes without saying that in this step of heating E5, only the external surface SE of the tube 2 or only the lower surface 63 of each reinforcement band 6 could be heated. By way of example, the heating device S may be of the radiative (e.g. infrared, laser), conductive (heating wire), convective (hot air), inductive or mechanical (ultrasonic friction) type.

Figure 8:
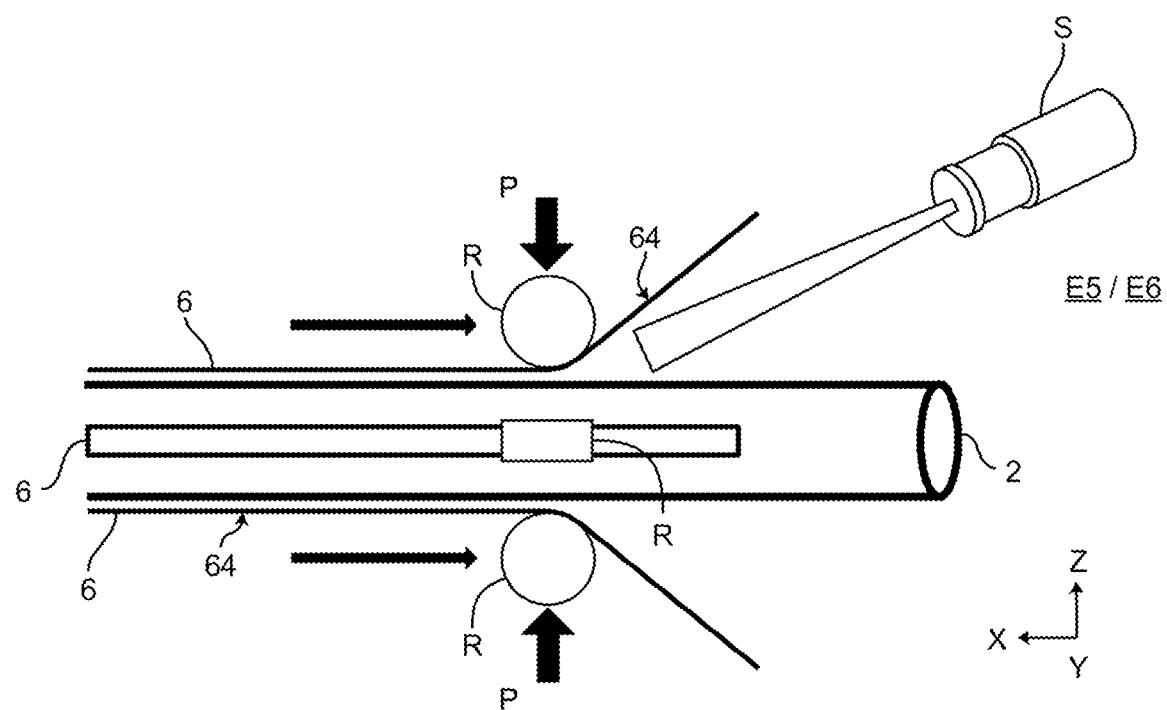
FIG. 8 is a schematic representation of the step of simultaneously attaching a plurality of reinforcement bands onto a thermoplastic tube.
Figure 9:
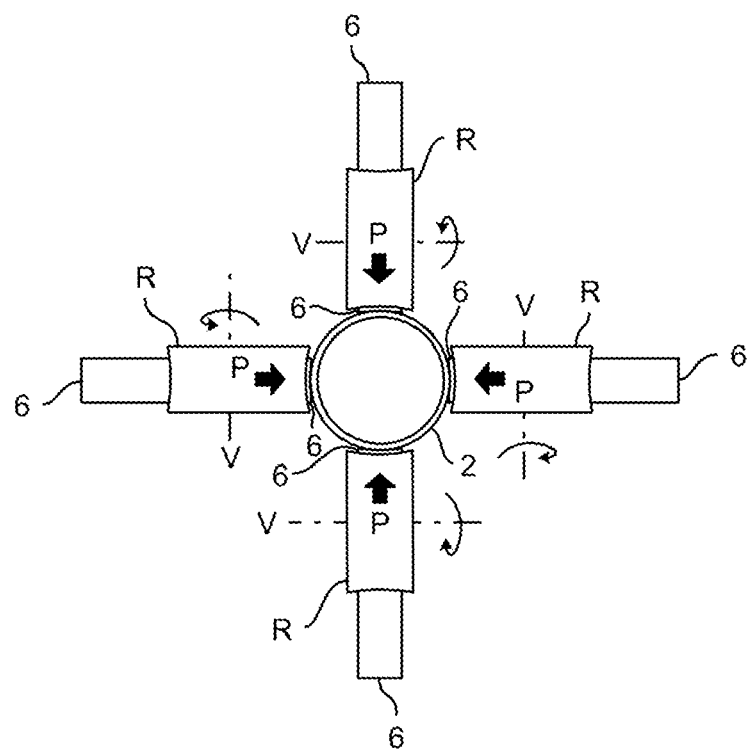
FIG. 9 is a cross-sectional view of the step of simultaneously attaching the plurality of reinforcement bands to the thermoplastic tube.

In a step of applying E6, each pressure member R then simultaneously applies an identical radial pressure force P to the upper surface 64 of each reinforcement band 6 positioned on the external surface SE of the first portion to be reinforced 21A of the tube 2, as shown in FIGS. 8 and 9. Such a step makes it possible to deposit all the reinforcement bands 6 at the same time. The distribution of the pressure members R and the application of the same pressure force P allow uniform application of pressure to the periphery of the tube 2, so as to avoid any risk of deformation of the tube 2. The steps of heating E5 and applying E6 of a force allow assembly by welding of the reinforcement bands 6 onto the tube 2.

Preferably, in these two steps of heating E5 and of applying E6 a pressure force P, the heating device S and the pressure members R move successively and progressively along the longitudinal axis X of the tube 2, as shown in FIG. 8, so as to gradually deposit the reinforcement bands 6 along the entire length of the first portion to be reinforced 21A. This document shows an example of a fixed tube 2 along which the pressure members R are moved in the form of rollers; however, it goes without saying that each pressure member R, as well as the heating device S, could also be fixed. The tube 2 would then move longitudinally along its axis X in order to deposit the reinforcement bands 6 along the entire length of the first portion to be reinforced 21A in a similar way to the steps of heating E5 and of applying E6 described previously.

The reinforcement bands 6 are thus attached to the external surface SE of the first portion to be reinforced 21A of the tube 2, thus forming the first reinforced portion 4A, shown in FIG. 2. The steps of heating E5 and applying E6 a pressure force P are then repeated for the second portion to be reinforced 21B, so as to form the second reinforced portion 4B.

The manufacturing method then comprises a step of bending E7 the portion to be bent 22, so as to form the bent portion 5. Thanks to the prior determination of the portions to be reinforced 21 and the portions to be bent 22 and the thin thickness and material of the reinforcement bands 6, this bending step E7 may easily be carried out by known and commonly used production machines. No fibers are bent, which is advantageous.

Thanks to the reinforcement according to the invention, the production chain of the pipe is not impacted and the pipe is locally reinforced, which allows it to resist buckling.

The invention claimed is:

1. A method of manufacturing a pipe intended to be mounted in a fluid circuit of an aircraft, the pipe comprising a tube and two connection ends, the tube being made of thermoplastic material and having a cylindrical shape, the tube defining an internal surface, intended to be in contact with the fluid, and an external surface opposite the internal surface, the manufacturing method, comprising:
   a step of determining at least two portions to be reinforced of the tube,
   a step of determining at least one portion to be bent, the portion to be bent being positioned between the at least two portions to be reinforced,
   a step of positioning at least one reinforcement band extending longitudinally over the external surface of the at least two portions to be reinforced, the portion to be bent being free of the reinforcement band, then
   a step of bending the portion to be bent.

2. The method of manufacturing according to claim 1, wherein the reinforcement band comprises reinforcement fibers impregnated with a thermoplastic resin.

3. The method of manufacturing according to claim 2, wherein the thermoplastic resin of the reinforcement band is identical to the thermoplastic material of the tube.

4. The method of manufacturing according to claim 3, wherein the thermoplastic resin of the reinforcement band and the tube is polyaryletherketone.

5. The method of manufacturing according to claim 2, wherein the reinforcement fibers are unidirectional fibers.

6. The method of manufacturing according to claim 1, wherein, in a cross-sectional plane, the reinforcement band (s) extend over an angular range of between 28 and 58° at the periphery of the reinforced portion.

7. The method of manufacturing according to claim 1, wherein the reinforced portion comprises at least three reinforcement bands distributed angularly over the external surface of the reinforced portion and positioned equidistant from each other.

8. The method of manufacturing according to claim 1, wherein the reinforcement band has a thickness of between 0.1 and 0.4 mm.

9. A method of manufacturing a pipe for use on an aircraft, the pipe comprising a thermoplastic cylindrical tube section having two connection ends, the tube section having an internal surface and an external surface opposite the internal surface, the manufacturing method, comprising:
   positioning one or more reinforcement bands over the external surface of the tube section at two spaced apart portions of the tube section to define two spaced apart portions of the tube section to be reinforced in a positioning step;
   bending a portion of the tube section at a location between the two spaced apart portions of the tube section to be reinforced to define a bent section in a bending step; and
   wherein the bent section is free of the one or more reinforcement bands and is formed after the positioning step.

* * * * *